United States Patent
Kacin et al.

(10) Patent No.: US 7,818,427 B2
(45) Date of Patent: Oct. 19, 2010

(54) IT AUTOMATION SCRIPTING MODULE AND APPLIANCE

(75) Inventors: Martin Kacin, Palo Alto, CA (US); David Kloba, Sunnyvale, CA (US); Michael Gray, Dublin, OH (US); Bill Clagett, Elizabethtown, KY (US); Matthew Lewinski, San Francisco, CA (US)

(73) Assignee: Kace Networks, Inc., Mountain View, CA (US)

( * ) Notice: Subject to any disclaimer, the term of this patent is extended or adjusted under 35 U.S.C. 154(b) by 879 days.

(21) Appl. No.: 11/689,486

(22) Filed: Mar. 21, 2007

(65) Prior Publication Data

US 2007/0226259 A1 Sep. 27, 2007

Related U.S. Application Data

(60) Provisional application No. 60/784,949, filed on Mar. 21, 2006.

(51) Int. Cl.
*G06F 13/00* (2006.01)

(52) U.S. Cl. .................. 709/226; 709/229; 709/245; 709/223; 718/100

(58) Field of Classification Search .......... 709/226, 709/229, 202, 223, 245; 718/100, 102
See application file for complete search history.

(56) References Cited

U.S. PATENT DOCUMENTS

| | | | |
|---|---|---|---|
| 6,449,636 B1 * | 9/2002 | Kredo et al. | 709/206 |
| 6,990,660 B2 | 1/2006 | Moshir et al. | |
| 7,003,578 B2 | 2/2006 | Kanada et al. | |
| 7,308,464 B2 * | 12/2007 | Nowitz et al. | 1/1 |
| 2005/0027687 A1 * | 2/2005 | Nowitz et al. | 707/3 |
| 2005/0234708 A1 * | 10/2005 | Meehan et al. | 704/9 |
| 2005/0262232 A1 | 11/2005 | Cuervo et al. | |
| 2007/0226249 A1 * | 9/2007 | Kacin et al. | 707/102 |
| 2008/0109396 A1 * | 5/2008 | Kacin | 707/1 |

OTHER PUBLICATIONS

"AdminGuide: Administrator Guide for KBOX, Version 2.1," KACE, Jan. 16, 2006, 143 pages.
"Automated IT Management: KBOX™," KACE, Jan. 2006, 20 pages.
"Help Desk Module: Integrated Help Desk Drives Faster Response and Increased User Satisfaction," KBOX by KACE, Jan. 2006, 4 pages.
"Jumpstart Program: Installation Assistance," KBOX by KACE, Jan. 2006, 10 pages.
"Kace Launches New Help Desk Module for Upgraded KBOX™ IT Management Appliance," Press Release, KACE, Jan. 30, 2006 [online] [Retrieved on May 30, 2007] Retrieved from the Internet<URL:http://www.kace.com/about/releases/01_30_06.php>.
Pollock, J., "White Paper: Silent Mode Installation Tips and Tricks for Windows," KACE, Sep. 2005, 27 pages.

* cited by examiner

*Primary Examiner*—Kenneth R Coulter
(74) *Attorney, Agent, or Firm*—Baker Botts L.L.P.

(57) ABSTRACT

A method for automating the performance of information technology (IT) tasks within an enterprise comprising a plurality of client devices is described. The method comprises the steps of receiving an input specifying a set of commands to be executed on a client device and generating a script based theron, wherein the script is configured to be executed by an agent on the client device, and receiving an input specifying to which of the plurality of client devices the script should be made available. The script is provided to a client device based on the input by publishing the script to a user portal, and by deploying the script to the client device.

24 Claims, 16 Drawing Sheets

IT AUTOMATION SCRIPTING MODULE AND APPLIANCE

CROSS-REFERENCE TO RELATED APPLICATIONS

This application claims the benefit of U.S. Provisional Application No. 60/784,949 (scripting), filed Mar. 21, 2006, which is hereby incorporated in its entirety by reference.

FIELD OF THE INVENTION

This invention relates generally to information technology (IT) systems, and more specifically to systems and methods for automating and deploying IT solutions in an enterprise environment.

BACKGROUND OF THE INVENTION

The same IT task is often performed on multiple machines within an enterprise. For instance, a certain suite of programs may be installed on every employee computer. Alternatively, every server within an enterprise may need to be updated in order to reflect changes in software and hardware to the network. Or, for example, a patch may be provided that needs to be applied to every installed version of a certain software program within an enterprise.

While existing enterprise software packages automate certain aspects of IT deployment and maintenance, individual services are generally offered by specific vendors in the form of discrete products. This requires IT professionals to become trained and certified on multiple products, for instance a helpdesk product, an anti-virus product, and an inventory management product, as well as to manage different protocols during normal workflow. The various products are often not interoperable, making coordination between them, for instance with respect to scheduling tasks or sharing information, impossible.

In addition, individual tasks may need to be deployed across different subsets of devices on a system. While individual devices can generally be identified by IP address, for instance, the manual selection of what devices should be included or excluded from a group is often time-consuming and prone to inaccuracy. IT professionals must also ensure that installation and deployment activities comply with company policies and license terms. Furthermore, while repetitive, these steps are often performed manually, on a piecemeal basis, as they may need to happen at different times depending on the needs and desires of end users. All of these factors increase the cost of maintaining and managing an enterprise network.

What is needed, therefore, are systems and methods of reducing the administrative and resources burden associated with carrying out IT tasks.

SUMMARY

In an embodiment, a computer program product for automating the performance of information technology (IT) tasks within an enterprise comprising a plurality of client devices is provided. The product includes a computer-readable medium and comprises computer program code encoded on the medium for receiving an input specifying a set of commands to be executed on a client device, generating a script based on the set of commands, receiving an input specifying a filter definition to be applied to the plurality of client devices and a label associated with the filter definition, assigning the label to any client device of the plurality of client devices that meets the filter definition, receiving an input specifying that the script should be made available to client devices assigned the label, and providing the script to client devices assigned the label.

In another embodiment, a system for developing and deploying information technology (IT) scripts within an enterprise comprising a plurality of entities is described. The system comprises a filtering system for applying labels to entities that meet filter definitions and removing labels from previously labeled entities that no longer meet filter definitions, and a scripting module for generating scripts for performing IT tasks on entities within the enterprise. It also includes a deployment module for deploying the generated scripts within the enterprise to entities based on labels assigned to the entities by the filtering system.

BRIEF DESCRIPTION OF THE DRAWINGS

FIGS. 4B-4F are screenshots of exemplary user interfaces for implementing the filtering system of FIG. 4A in accordance with an embodiment of the invention.

FIG. 7 is a screenshot of an exemplary administrative portal in accordance with an embodiment of the invention.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

Various methods, systems, products, and interfaces for automating IT management in an enterprise environment are disclosed. The features and advantages described herein are not all-inclusive and, in particular, many additional features and advantages will be apparent to one of ordinary skill in the art in view of the figures and description. It should also be noted that the language used in the specification has been principally selected for readability and instructional purposes, and not to limit the scope of the inventive subject matter. Furthermore, the description herein focuses on selected features of an IT automation system including filtering/labeling, scripting, and user and administrator portals. Other techniques, functionalities, and components not discussed, whether conventional or custom, can be used as desired in conjunction with providing these features, as will be apparent in light of this disclosure.

Enterprise Environment

Figure 1:
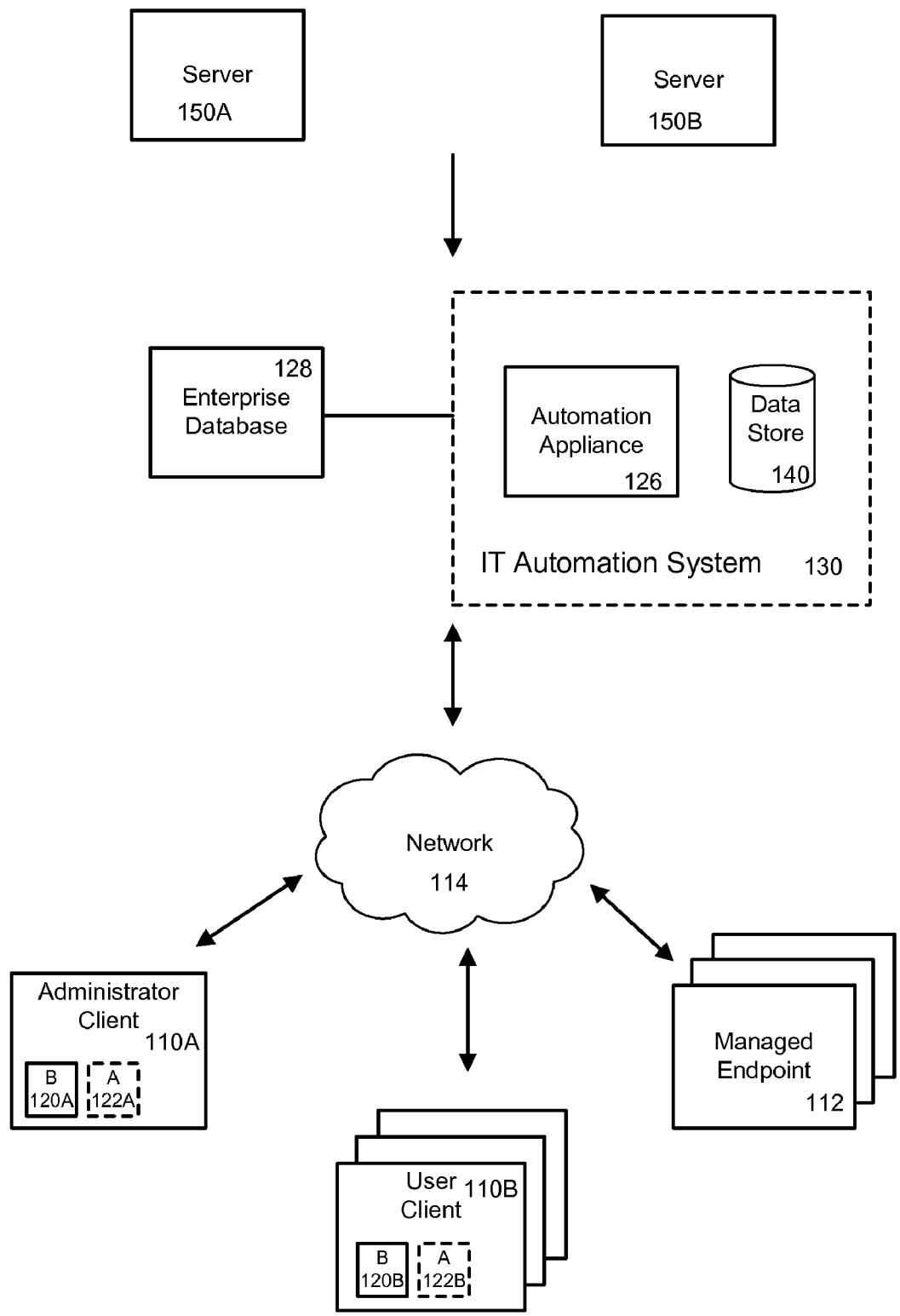
FIG. 1 is a high-level diagram illustrating an enterprise environment in which an IT automation system can be used to carry out IT tasks according to an embodiment of the invention.

FIG. 1 is a high-level diagram illustrating an enterprise environment 100 in which an IT automation system 130 can be used to carry out various IT processes. The environment 100 includes an IT automation system 130 and several client devices 110, 112 communicatively coupled to each other via a network 114. The IT automation system 130 manages IT processes across the enterprise 100 on administrator and user clients 110 as well as managed endpoints 112 such as switches and routers. The system 130 collects data and definitions from an enterprise database 128 within the enterprise and uses those to identify and track the client devices 110, 112. It distributes data to and receives requests and information from the devices 110, 112. The system 130 also receives and processes updates, applications, and other data from third party servers 150 outside the enterprise, and provides the data in appropriate form to devices 110, 112. In an embodiment, the system 130 also shares information with one or more third party servers 150 to be provided to IT managers and users beyond the enterprise.

The techniques described herein can be employed in any number of enterprise environments, such as small and medium sized companies, colleges and universities, virtual enterprises or communities, or other distributed computing environments. An IT automation system 130 can be used to automate routine and complex IT maintenance tasks, and improve IT efficiency, compliance, and data and network security. Numerous other benefits will be apparent in light of this disclosure.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110" and/or "110B" in the figures).

The IT automation system 130 provides a variety of services to client devices 110, 112, and collects and tracks the status of these devices 110, 112. The system comprises an automation appliance 126 for storing applications that support IT services and a data store 140 for storing scripts, policies, plans, structures, and logs of IT automation system 130 activities. The automation appliance 126 may comprise a high performance server that includes a backup and recovery system and multiple processors for carrying out service-related tasks designed to be used as a plug 'n play device. Or, it may comprise a general purpose server or system of servers onto which software for performing the tasks has been loaded. An exemplary automation appliance is further discussed with reference to FIG. 2.

The IT automation system 130 may include one or more computers operating under a load balancing scheme, with each computer configured to respond to and interact with the client devices 110, 112. The IT automation system 130 comprises a data store 140 coupled to or included in the appliance 126 for storing data generated in the course of performing IT tasks such as inventory information, scripts, policies, plans, structures, and/or logs of IT automation system 130 activities. Inventory and other information about devices 110, 112 stored in the data store 140 can be accessed and used when performing tasks such as patching, software installations, various security functions, and reporting. The data in the store 140 can thus be leveraged across different tasks. The data store 140 may be implemented as one or more relational database management system (RDBMS), lightweight database access protocol (LDAP), flat file, and/or other databases, or using another database architecture. Data may be organized into libraries, reports, and other forms to be accessed by administrator and client users 110.

The IT automation system 130 is communicatively coupled to an enterprise database 128, for instance, an LDAP, Active Directory, or SAN facility database. The system it is configured to request and receive enterprise data from the database 128 in accordance with one or more enterprise database protocols. Such data may comprise organizational structure, enterprise directory, and device ownership information. The IT automation system 130 is also connected to one or more third-party servers 150 from which software patches, updates, definitions and other application data can be received. Such servers 150 may be associated with operating system, application, and/or device providers such as Microsoft, Adobe, and Hewlett-Packard that regularly publish software and information to be used with their products. One or more servers 150 might also be associated with the provider of the IT automation system 130 and provide additional features and updates do be implemented on the IT automation system 130.

IT tasks may be managed with respect to different entities and entity groupings within an enterprise. Such entities, may comprise, for instance, clients, devices, managed endpoints, users, enterprise groups, etc. Various clients 110, for example are utilized by end users in their operations in the enterprise 100. As shown, there is an administrator client 110A, generally used by an IT professional, and several user clients 110B, utilized by end users within the enterprise, typically employees. In an embodiment, one or more clients 110 comprises a typical personal desktop or laptop computer such as an IBM-PC, SUN Microsystems SPARC, or Apple-compatible computer. In another embodiment, one or more clients 110 are another type of electronic device, such as a mobile telephone, personal digital assistant (PDA), or portable email device. A client device 110 may run a Windows, Max, Solaris, JAVA, UNIX, Linux, proprietary, Palm, device-specific or similar operating system. In an embodiment, the automation system 130 is capable of communicating with a variety of clients 110 working on different operating platforms. The IT automation system 130 may also be coupled to and manage a variety of managed endpoints 112. Depending on the enterprise, the managed endpoints 112 may comprise devices such as servers, switches, routers, firewalls, access points, and peripheral devices such as scanners and printers. The endpoints 112 are capable of communicating with the automation appliance 126 agentlessly in accordance with a protocol such as Simple Network Management Protocol (SNMP). Full-level inventorying, log file generation, determination of settings, and configurations management may be performed on endpoints 112.

There are a variety of possible ways for a client device 110 to communicate with the IT automation system 130, as described with reference to FIG. 2. Each client 110 may comprise a browser 120 or comparable application for providing a user interface that can be used to access information from and provide instructions to the IT automation system 130 to execute tasks on devices in the enterprise 100. In addition, agents 122 stored on the client may be used to carry out instructions on their respective clients 110 provided from the IT automation system 130. Or, such instructions may be carried out agentlessly at the operating system or command line level.

The network 114 enables data communication between and among the entities shown in FIG. 1 and in one embodiment is the Internet. In another embodiment, the network 114 is a proprietary local area network (LAN) or wide area network (WAN) operated by a mapping or directions service that may or may not include Internet-based connections. In one embodiment, the network 114 uses standard communications technologies and/or protocols. Thus, the network 114 can include links using technologies such as Ethernet, 802.11, integrated services digital network (ISDN), digital subscriber line (DSL), and asynchronous transfer mode (ATM). Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) and/or other formats. In addition, all or some of links can be encrypted using conventional encryption technologies such as the secure sockets layer (SSL), Internet Protocol security (IPsec), Secure HTTP and/or virtual private networks (VPNs). In another embodiment, the entities can use custom and/or dedicated data communications technologies instead of, or in addition to, the ones described above.

The IT automation system 130 may be set up and configured using any of a variety of techniques. In an embodiment, during the set-up phase of the IT automation system 130, the automation appliance 126 auto-discovers network-wide hardware and software configurations on client devices 110 via managed virtual agents or agent-less network scanning. For client devices 110 that use local agents 122 to communicate with the IT automation system 130, agents are deployed on each device 110. This may be managed from an administrator portal by which the devices 110 to receive agents 122 can be designated. Or an email or other notification may be sent to users containing the agent installation file or pointing to a remote server 150 hosting the installation file. Alternatively, log-in scripts may also be used.

Data Model

Figure 2:
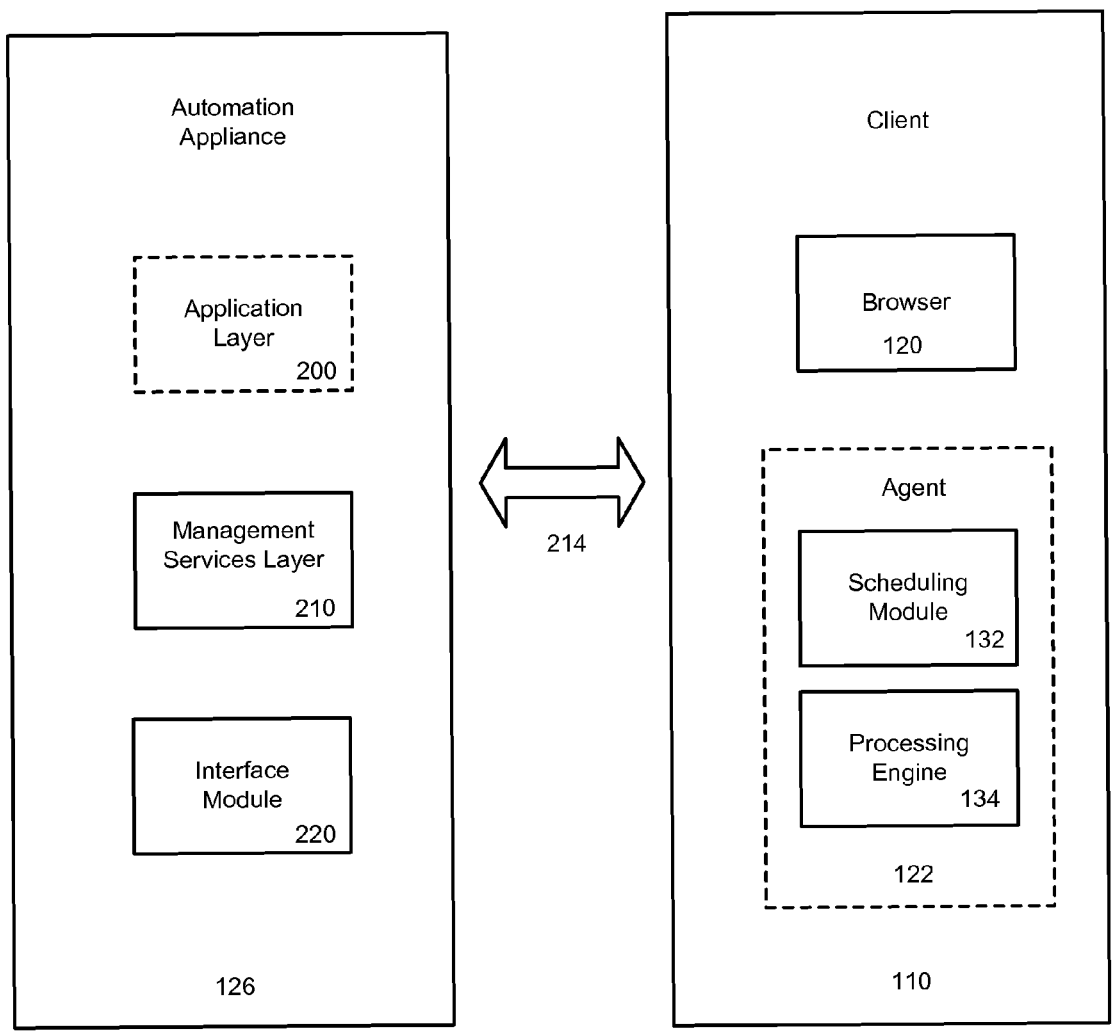
FIG. 2 is a block diagram of an IT automation appliance in communication with a client in accordance with an embodiment of the invention.

FIG. 2 is a block diagram of an IT automation appliance 126 in communication with a client 110 in accordance with an embodiment of the invention. Data 214 is provided to and from the automation appliance 130 and the client 110 in accordance with carrying out one or more IT tasks. The appliance 126 comprises an application layer 200 that contains IT management functionality. The application layer 200 comprises various modules for performing inventory, deployment, security, helpdesk, patching, alerting, reporting and/or other IT-related tasks within the enterprise; an exemplary layer 200 is described with reference to FIG. 3. The appliance 126 may also comprise a management services layer 210 for performing support services to the automation appliance 126. Such services include provisioning, backup and recovery for all automation appliance 126 software and data on the data store 140, security functions, updating software components, and managing communications with the enterprise database 128.

Figure 6A:
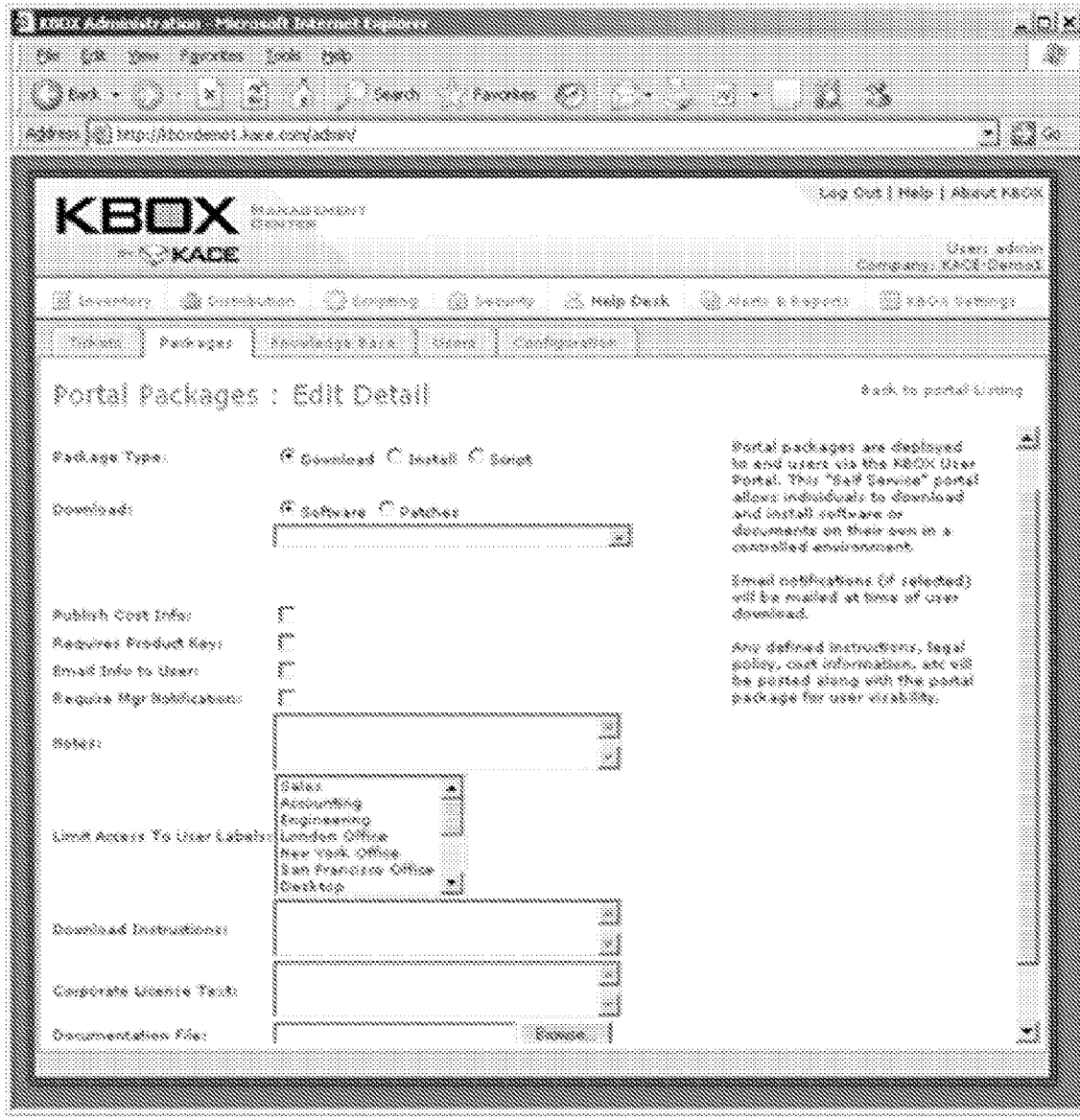
FIGS. 6A-6C are screenshots of an exemplary client portal in accordance with an embodiment of the invention.
Figure 7:
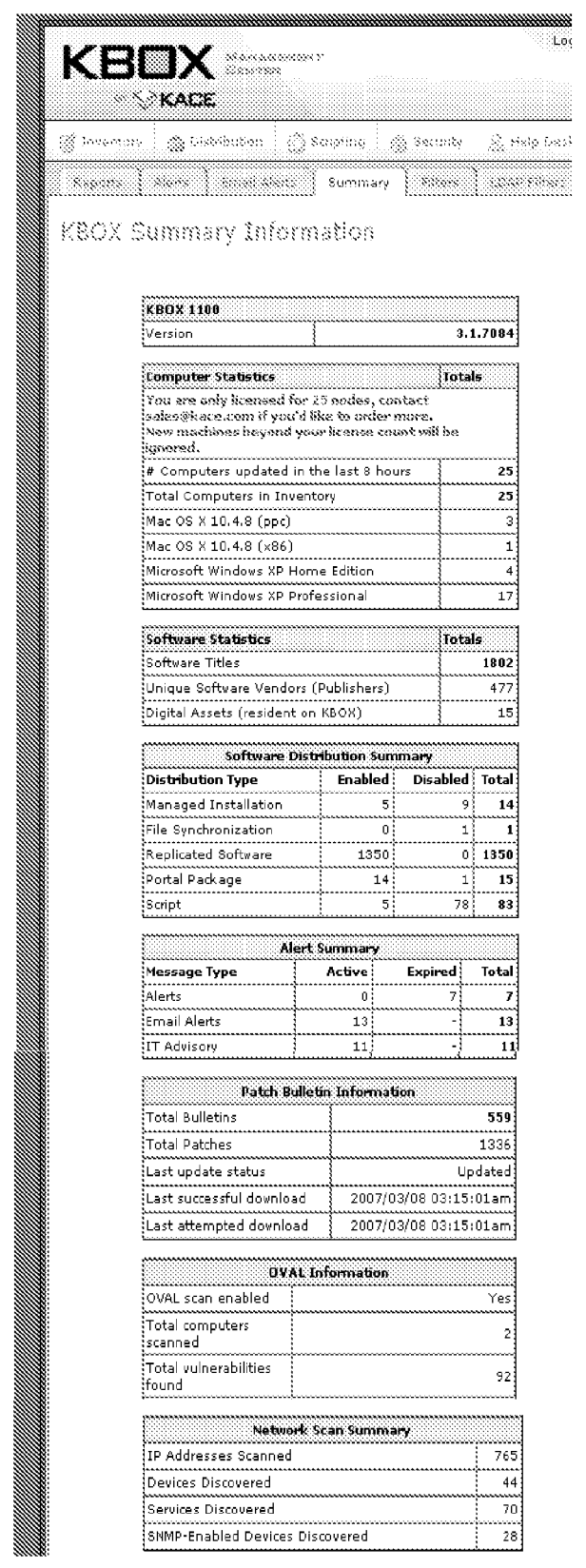

The automation appliance also includes an interface module 220 for managing communications between the automation appliance 126 and various clients 110, managed endpoints 112, and third-party servers 150. The interface module 220 comprises different protocols for communicating with the different clients 110, as well as managed endpoints 112. The interface module 220 can receive various types of information about entities 110, 112 on the network from agents; for instance, the status of scripts deployed by the deployment module to computers associated with the entities, inventory information, and user requests. Using protocols stored in the interface module, the appliance 126 is capable of carrying out IT tasks on the heterogeneous operating systems of various network elements 110, 112. It also generates and provides HTML (hypertext markup language), images, scripting language (e.g., JavaScript, JScript, Visual Basic Script), XSLT (extensible stylesheet language transformation), and other static elements that are executed by a browser 120 to provide user interfaces to clients within the enterprise. In an embodiment, the interface module 220, provides different interfaces to clients 110 depending on their membership in a label group, as described later. For instance, the interface module 220 may supply an administrator portal to users that are labeled "administrators" and client portals other users. FIGS. 6A-7 comprise exemplary interfaces of such portals. The interface module 220 may "broadcast" information through bulletins posted to portals that can be searched and accessed by end-users logging onto the portals.

In an embodiment, management services and application layer functionality are accessible by a web-based console executed on a browser 120. This enables the appliance 126 to be deployed locally behind the firewall or another secure part of the enterprise 100. The appliance 126 may also be deployed in a remote location. Examples of browsers 120 include Microsoft's Internet Explorer browser, Netscape's Navigator browser, Mozilla's Firefox browser, PalmSource's Web Browser, Opera/Safari, or any other browsing or application software capable of communicating with network 114.

In an embodiment, an end user logs in to a user or administrator portal using local or LDAP/Active Directory authentication. The network credentials to support this login are retrieved by the automation appliance 126 from an active Directory or LDAP Directory stored in the enterprise database 128 of FIG. 1 and updated on a regular basis. This leverages an enterprise's existing authentication scheme and potentially avoids multiple sign-on requirements.

As shown in FIG. 2, the client 110 includes an agent 122 for receiving and carrying out requests from the automation appliance 130. The agent 122 includes a schedule module 132 and a processing engine 134. As used herein, the term "module" can refer to computer program logic, embodied on a computer readable medium, for providing the specified functionality. A module can be implemented in hardware, firmware, and/or software. Preferably, a module is stored on the storage device of a computer, loaded into the memory, and executed by a processor.

The agent 122 receives a variety of data 214, including downloads, installations, files, scripts, alerts, and other distributions and/or task requests from the automation appliance 126. During the installation of an agent 122 on a client 110, the agent 122 is instantiated with elevated administrative privileges that allow it to manage and control various aspects of the client 110 as well as access information about it.

The agent 122 comprises code for managing the received data 214, as well as for carrying out scripts provided from the automation appliance 126. The scripts may instruct, for instance, an inventory scan of the status of the software and hardware characteristics of the client 110 or update and patch programs on the client 110. The agent 122 includes a scheduling module 132 that interprets the schedule definitions and instructions, and triggers the agent 122 to carry out scripts and tasks at the appropriate times or intervals. The scheduling module 132, for instance, could determine when a monthly virus definition update should take place, or when to apply a series of patches to various software programs. The processing engine 134 validates the integrity of the task being requested and then, as appropriate, executes the script containing the task within a privilege context. From within the privilege context, the automation appliance 130 has the ability to access, execute, and control any resource on the client 110 necessary to carry out the requested tasks, at the operating system, command line or other operational level. As described later, an agent may be comprised of individual modules for carrying out various scripts and tasks on a client. Inventory and related information may be provided by the agent 122 back to the automation appliance 126 where it is collected placed into a data store which is automatically indexed and made searchable from a web browser client.

In an embodiment of the invention, tasks described above are carried out on the client 110 without an agent, i.e. in an agentless context. This is accomplished through the use of software and protocols installed on the client 110 as part of its operating system or other software applications installed on a client 110 or endpoint 112. In an embodiment, depending on its operating environment, the client 110 or endpoint 112 operates in accordance with a log 4j, Common Internet File System (CIFS), Secure Shell (SSH), or Simple Network Management Protocol (SNMP) protocol.

In an embodiment, the client 110 communicates with the automation appliance 126 according to a variety of possible communication settings. Communication between the agent 122 and automation appliance 126 can be agent- or appliance-initiated, and in an embodiment, utilizes HTTP and TCP/IP sockets. In an embodiment, the agent 122 is in communication with the automation appliance 126 on a scheduled basis so as to minimize the use of client 110 processing resources and workflow disruption. According to another setting, the agent 122 reconnects with the automation appliance 126 on regular intervals, for instance, once every 48 hours. The automation appliance 126 may also apply a variety of load-balancing schemes to manage the needs of multiple clients 110 and entities in an enterprise. It may, for instance, accept only up to a maximum number of client connections, time deployment to take place during specific time windows, and ensure the ability, through a Wake-on-LAN feature, to schedule client communications during off hours even if the client 110 has been shutdown, or the download process is taking place over a slow connection Application Layer FIG. 3 comprises a representation of the application layer 200 of an IT automation system 130 in accordance with an embodiment of the invention. It includes a scripting module 240 for developing scripts and policies to carry out IT tasks on entities in the enterprise, and a filtering system 270 for designating targets of enterprise through the user of labels. In an embodiment, the filtering system 270 allows users to specify labels through a user interface (labeling) and applies these labels automatically (filtering) to client devices on an enterprise network.

The application layer 200 comprises a deployment module 250 for carrying out remote installation and distribution of applications, service packs, updates, and digital assets. Distribution and updates can be managed in a flexible way through the use of a filter for designating target machines. The deployment module 250 supports the deployment of service upgrades, software applications, and utilities to target devices. In an embodiment, it allows for quiet and silent mode installation, and allows for package specific switches to be designated, for instance based on the client type and/or a filter. The deployment module 250 can also be used to implement file synchronization, wake-on-lan, and various load-balancing tasks.

Also included is an inventory module 280 for collecting information about elements or entities on an enterprise network. During an initial scan, information about the operating system, applications, registry entries and files, hotfix, patch status, SNMP status, and offline inventory information may be collected. A combination of network, connection and SNMP scanning can be used to identify and inventory all network connected devices. Network scanning for instance, may utilize ICMP-based ping to identify systems. Connection scanning can utilize UDP and TCP to identify open ports and the common services running on those ports. SNMP scanning may retrieve SNMP data over standard SNMP ports.

The application layer 200 includes a helpdesk module 260 that provides helpdesk functions across the network. For instance, it may provide services such as support ticket submission and notification for tickets, configurable ticket auto-assignment & escalation rules, and customizable and extensible ticket fields. In addition, the status of helpdesk tickets can be tracked by users within a user portal as described in greater detail below.

The application layer 200 includes a security module 290 for scanning and reporting on security vulnerabilities on the network. The module 290 enforces security policies and provides automatic remediation. If necessary, it can also quarantine a client to prevent security breaches and/or network infections. In an embodiment, vulnerability screening and reporting carried out by the application layer is based on the Open Vulnerability and Assessment Language (OVAL) standard sponsored by US-CERT at the U.S. Department of Homeland Security.

Figure 3:
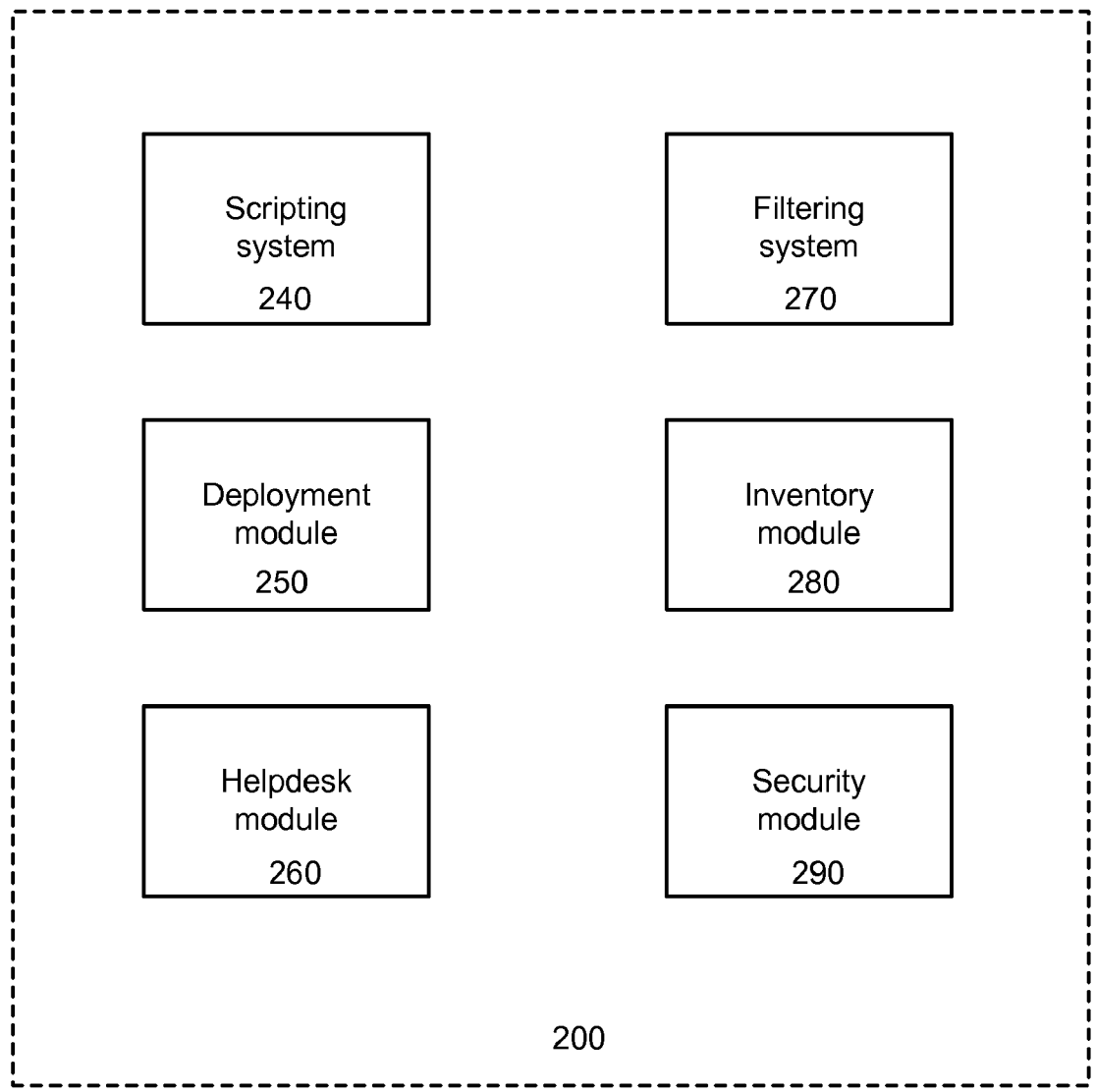
FIG. 3 is a block diagram of an application layer of an IT automation system in accordance with an embodiment of the invention.

The application layer 200 also may include other modules and functionalities in addition to those shown in FIG. 3. For instance, it may include a patch module for maintaining a patch knowledgebase and carrying out automated patch deployment and compliance reporting. The knowledgebase may be updated by information provided by third party servers. In addition, a reporting module may be provided that includes reporting tools for creating tools based on data within the data store 140. These reports may cover hardware inventory, software inventory and licensing, patch status, and other categories. 3rd party reporting formats and tools, for instance, ODBC compliant reporting tools (e.g., Crystal Reports) may be provided to enable analysis of collected information. In addition, an alerting module can be used to send configurable emails or broadcast alerts to a client desktop or other messaging outlet. All of these modules can use labels and filtering to target clients and devices on the network.

In an embodiment, data about devices and clients are shared across modules and systems within the application layer 200. For instance, data collected by the inventory module may be used by the scripting module to determine what clients to which a script should be distributed. Likewise, deployment of a security patch by the deployment module 250 may be performed on clients with security vulnerabilities identified by the security module 290. In an embodiment, this information may be passed between modules, in response to requests, or stored in a data store as described earlier.

As described earlier, IT tasks may be carried out on client devices through agents on each client, as described earlier. In an embodiment, each of the agents is comprised of a combination of agent modules that comprise complementary code for carrying out the tasks of the application layer 200 modules of FIG. 3. For instance, an agent may comprise an agent scripting module, agent deployment module, agent inventory module, and/or an agent security module. The agent scripting module receives scripts from an automation appliance server, caches the script into a machine readable form on the client (in the agent), and executes the script based on the script schedule managed by a scheduling module. Executing the script can be triggered by real-time communication from the server or executed at a later point, for instance, while the computer is network disconnected from the server. The script may further specify "single shot" and or recurring scripts or policies. The agent scripting module translates all script tasks, actions, and instructions into machine actions, call outs, and processes on the agent. The module logs actions performed within the script and uploads the log results and script output back to the server.

An agent deployment module can receive deployment payloads from the server and apply transfer and hashing algorithms to verify proper/complete transfer of each payload. This module executes the deployment payload per its definitions (managed installation, file transfer, patch installation, software update) locally on the client using all command lines switches, options, and instructions given to it by the server. Once the deployment operation has been executed, all steps logged by the agent deployment module are uploaded to the appliance.

An agent inventory module can provide support to inventorying tasks. The agent module queries the operating system using native or popular methods for determining hardware and software inventory on the operating platform. In an embodiment, a universal agent "speaks" in different operating system languages and is capable of using the one appropriate to the client device, and performs different operations and uses different protocols depending on the host platform. The agent inventor module collects all inventory data and assembles it into an XML representation that is transported up to the appliance for storage. The agent inventory module logs its activity and report errors in inventory collection back to the appliance.

Finally, an agent security module may be provided which includes an anti-malware engine that scans the local system (in either or both on-demand or on-access methods) for viruses, trojans, worms, spyware, or other malicious objects. Once malware is detected, it may be quarantined or removed or both by the agent security module. The configuration settings for the scan are dictated by an automation appliance and the agent module can report all security statistics back to the appliance. The security module may include local machine firewalling and network quarantine for the purpose of network access and protection. The security module may also enable and manage full disk encryption to protect endpoint data from data theft and other malicious behavior.

Filtering System

Figure 4A:
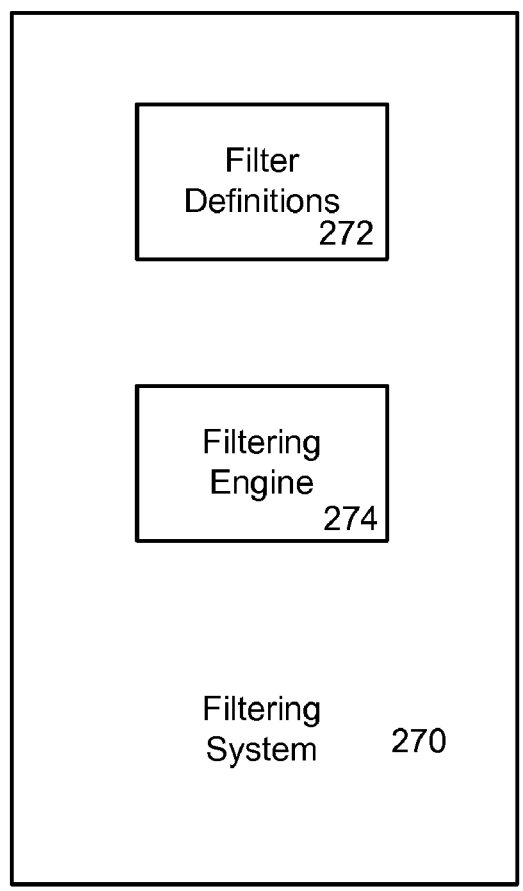
FIG. 4A is a block diagram of a filtering system of an IT automation system in accordance with an embodiment of the invention.

FIG. 4A is a block diagram of a filtering system of an IT automation system in accordance with an embodiment of the invention. FIGS. 4B-4F are screenshots of exemplary user interfaces for implementing the filtering system of FIG. 4A in accordance with an embodiment of the invention. The filtering system 270 enables filters to be defined and applied to various clients and devices on the enterprise. The filters can be defined and applied based on a wide variety of criterion, including device, user, or other criterion. Labels associated with each filter are assigned to enterprise entities such as client devices, users, or locations. The labels can be used to target the delivery of inventory, distribution, scripting, security, help desk, and reporting services.

In an embodiment, filters can be created using interfaces such as those shown in FIGS. 4B-4F. Filter definitions 272 and label names associated with the definitions are received from administrators and other users through these interfaces and stored in the filtering system 270. Each filter may be defined by one or more filter definitions 272. A user can specify a filter definition 272 that relates to any of a variety of attributes or characteristics, for instance, belonging to a range of internet protocol or MAC addresses, being in a certain physical location such as the Paris office, the type of software or hardware being run by a device, or the enterprise group a user or device belongs to. Other definitions 272 may relate to a device attribute, such as the percentage of memory or disk used, a machine name, an operating system or BIOS characteristic, or the last time the device was scanned, for example. Or it might reflect an aspect of a machine's service contract or another criterion.

The filtering engine 274 evaluates and can apply filter definitions 272 to data from various sources, including individual clients and client agents. As agents on the clients communicate with the automation appliance, filter definitions 272 may be evaluated in real-time against the data transmitted from each separate agent. In an embodiment, on a regular basis, in response to a user request, or when data is received by the filtering system 270, the filter applies the filters to the data. Depending on whether an entity meets a filter definition 272, the associated label is either applied to or removed from the respective entity (computer, user, etc).

The filtering engine 274 may evaluate user logon information gathered by or from modules within the automation appliance, for instance a helpdesk module. As users log in to a user portal to access the helpdesk, filters are executed against the user login data and "label" membership is evaluated in real-time, resulting in user access only to label aware software and helpdesk information. The options provided to the user by the helpdesk module thus specifically reflect the label characteristics of the user.

Figure 4B:
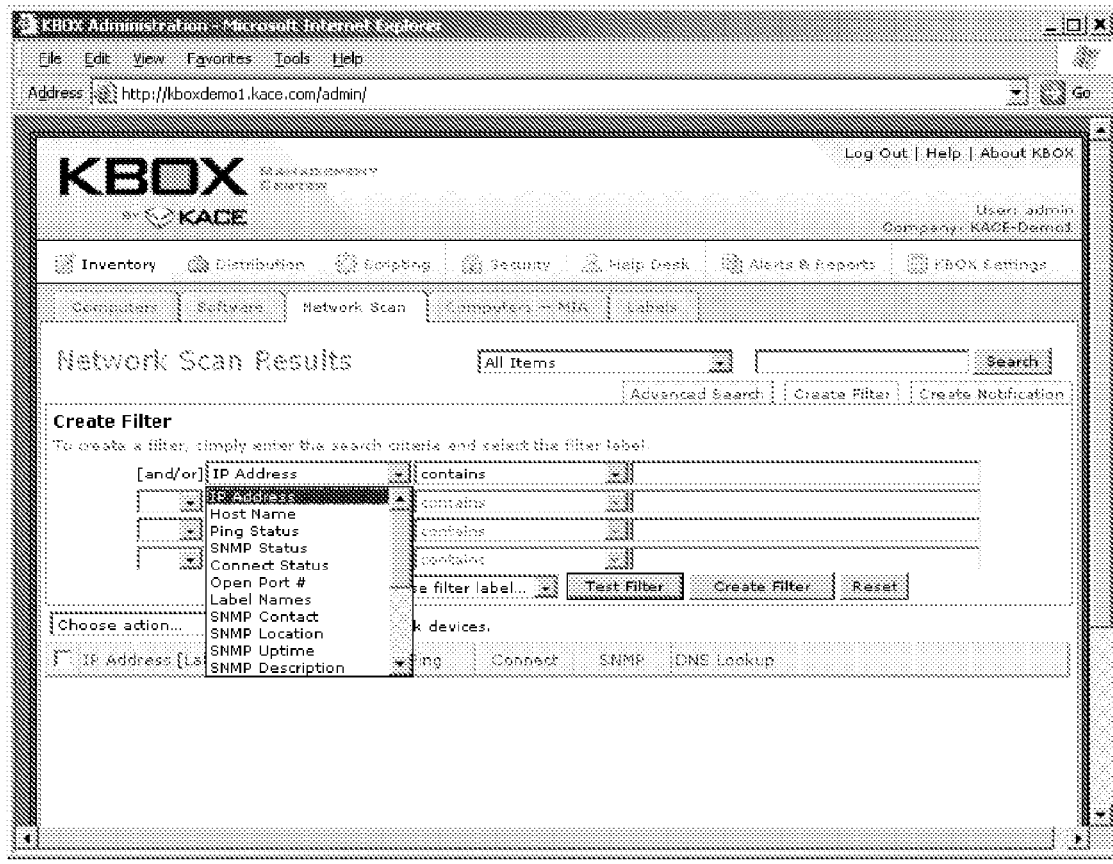

In addition to evaluating data received from the application layer and the client agents, the filtering engine 274 may evaluate data being received from inventory scans carried out by the inventory module. As the automation appliance scans the LAN (local area network) based on IP address ranges, data retrieved from all scanned targets (IP addresses) are processed by the filtering engine and labels are applied and removed as appropriate from each scanned target. A definition for a Scan Filter is encapsulated in the user interface as shown in FIG. 4B. As shown, fields including IP address, Host Name, and a variety of SNMP characteristics can be used to develop filters.

Based on information received from an administrator, labels are instantiated and displayed as tags associated with various network entities (computers, users, software, and hardware). Labels may be utilized to both "categorize" an entity or set of entities and may additionally be used to identify the "target" of an automation appliance action such as software installation and distribution, file distribution, patch deployment, script execution, security policy management, wake-on-lan messaging, and help desk publishing.

Figure 4C:
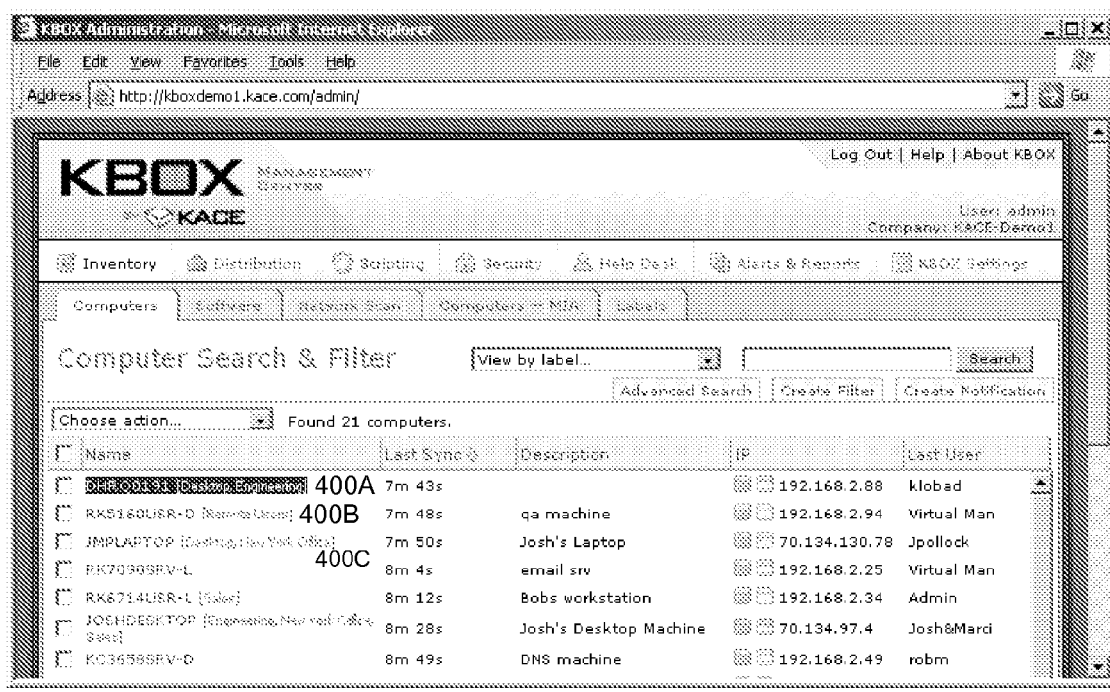

The screen shot of FIG. 4C illustrates the display of labels 400. The labels 400 associated with a computer inventory list are listed to the right of each computer name. The first computer in this example has two labels—"Desktop and Engineering" 400A. Labels used for categorization may provide a mechanism to "tag" items based on physical location, item type, item ownership, or functional usage. For example, labels may be utilized to identify where certain computer assets are stored, which department owns and operates a particular set of computers, and/or the specific type of computer (laptop, desktop, server, etc). Labels may also be associated with attributes such as the specific storage location of an object or the types of software it includes. Attributes associated with labels may provide a secondary or indirect dimension to the association of a managed entity to some other management variable (through the label as the proxy for the association). In an embodiment, label definitions can be associated with label attributes to reference dynamic storage locations of members of the label group.

Figure 4D:
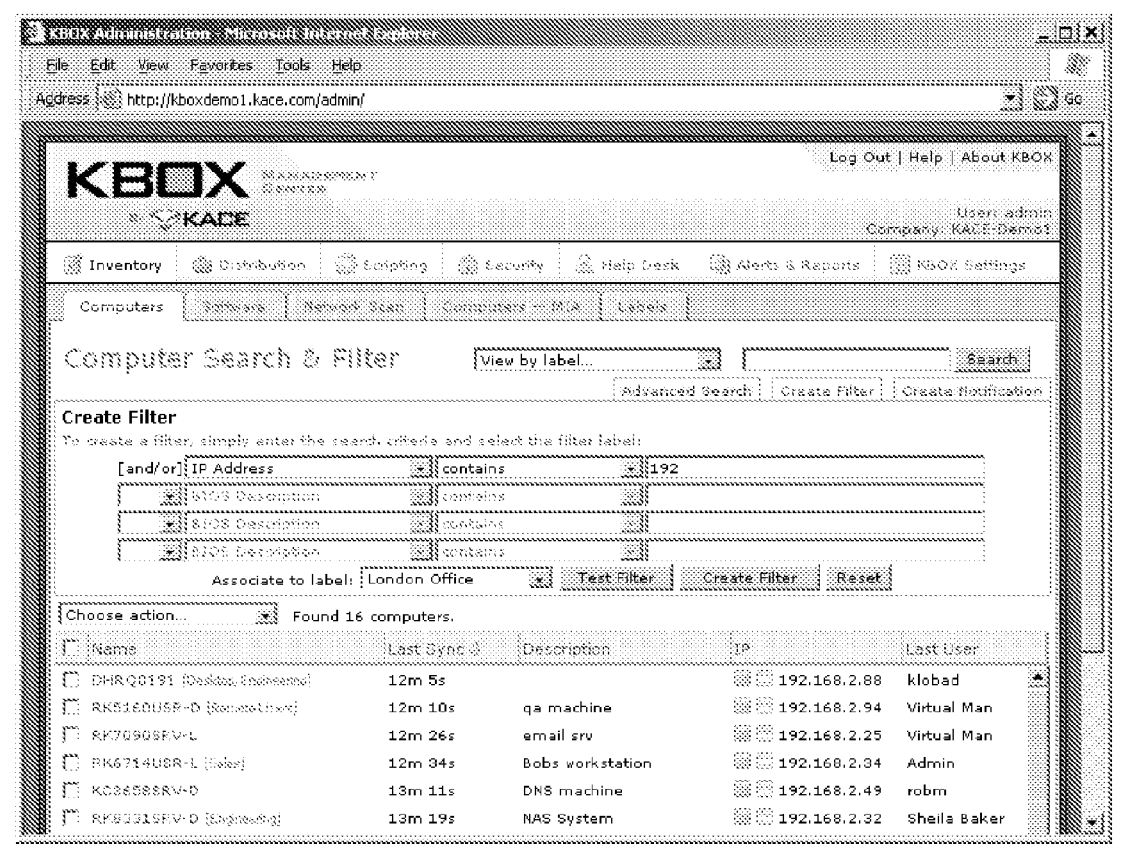

The screenshot of FIG. 4D illustrates one way in which filters may be created/defined within a user interface. In this example, all computers which contain "192" in their IP (Internet Protocol) Address may automatically have the label "London Office" applied to them at filter execution time by the filter engine. The filter interface shown supports up to four search expressions for any one search filter or a filter definition 272. A search expression includes the following parts:

Opening Search Operand: This operand may be any automation appliance data object or custom defined data object.

Search Operator: Contains, Does Not Contain, =, !=, <, >, is null, is not null, and matches regex (regular expression syntax), does not match regex Closing Search Operand: Free format field value, wildcard character, or combination of values and wildcard characters Each search expression is combined through a logical operator of either "and" or "or".

Figure 4E:
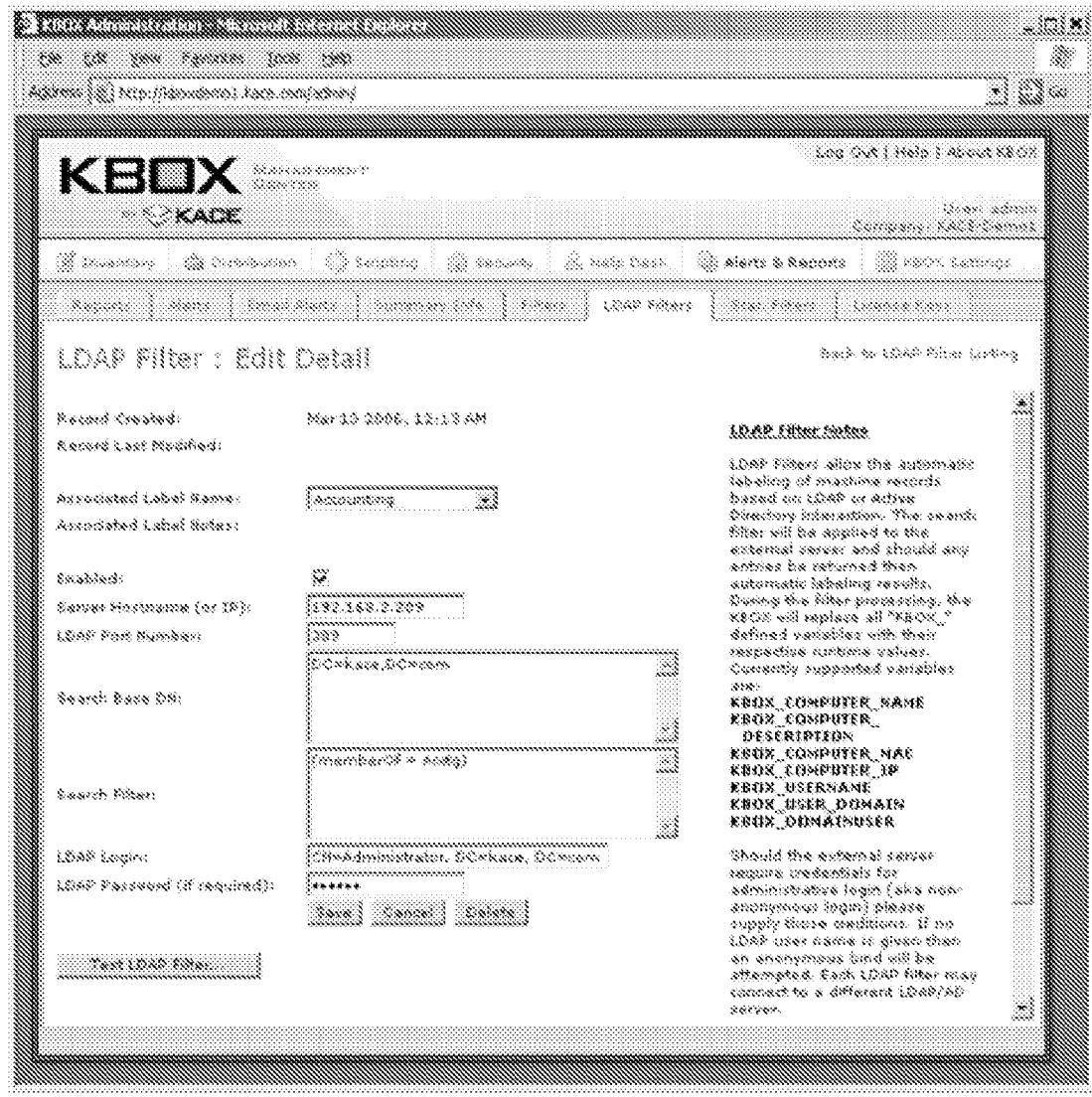

Enterprise directory information can also be used to create filters. The filtering system 270 collects directory information from an enterprise server and uses it to identify entities on the enterprise network. The screenshot of FIG. 4E shows an example of how, in an embodiment, LDAP filters can be created/defined. In this example, all computers whose "user" is a member of the group "finance" as defined in an external LDAP directory server (specified in the example shown at IP Address 192.168.2.209) may be applied with the label "Accounting" automatically by the filter engine at execution time. The filtering system 270 comprises query and syntax information by which LDAP data can be accessed and processed to pre-populate query fields.

Figure 4F:
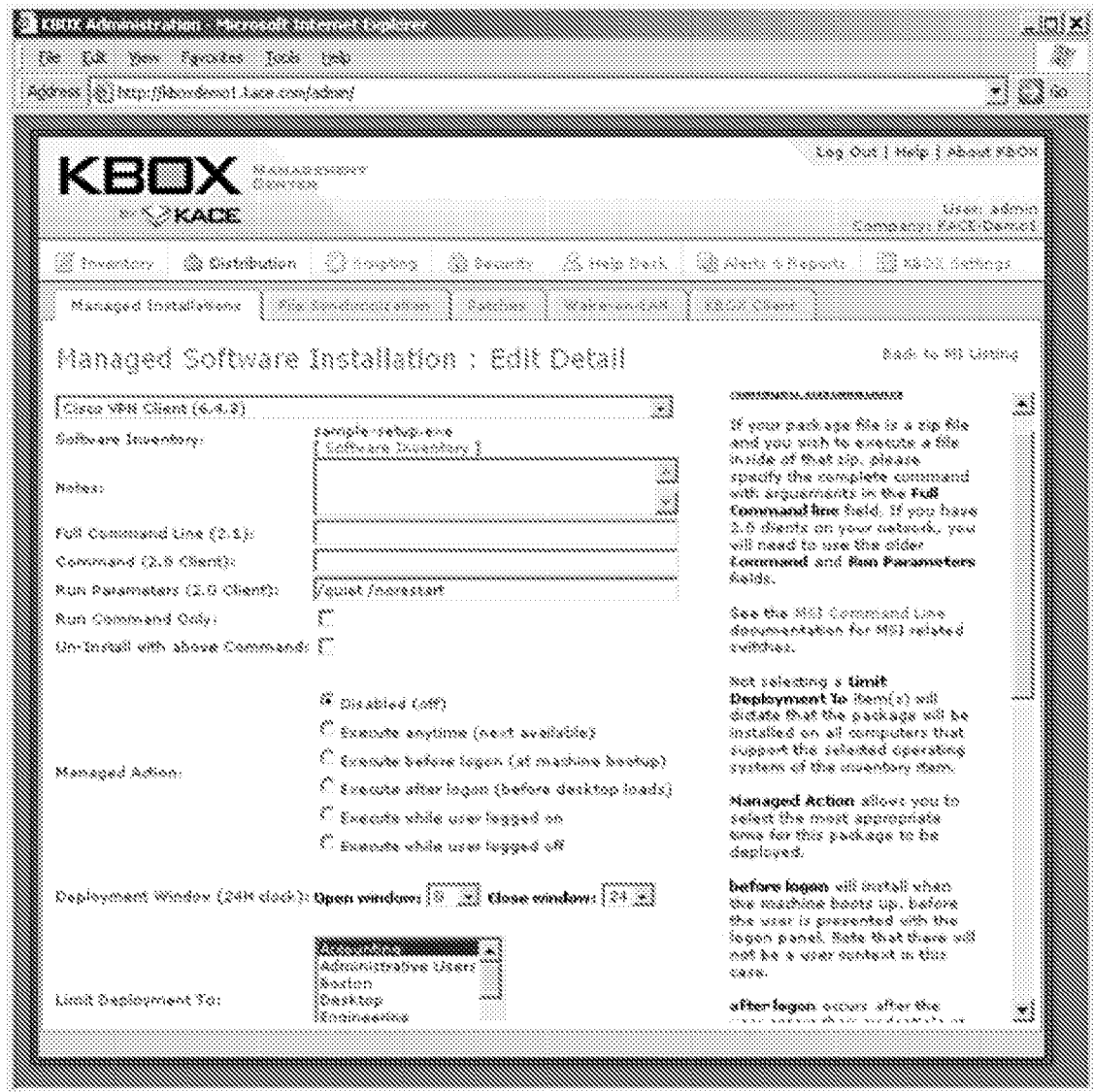

Once defined, a label can be applied to target the specific recipients of various managed actions within an enterprise. FIG. 4F illustrates how, for example, a label can be used to manage the deployment of a software installation. As shown in FIG. 4F, all computers who have been determined to be part of the "Accounting" label may receive the managed software installation automatically.

Scripting Module

Figure 5A:
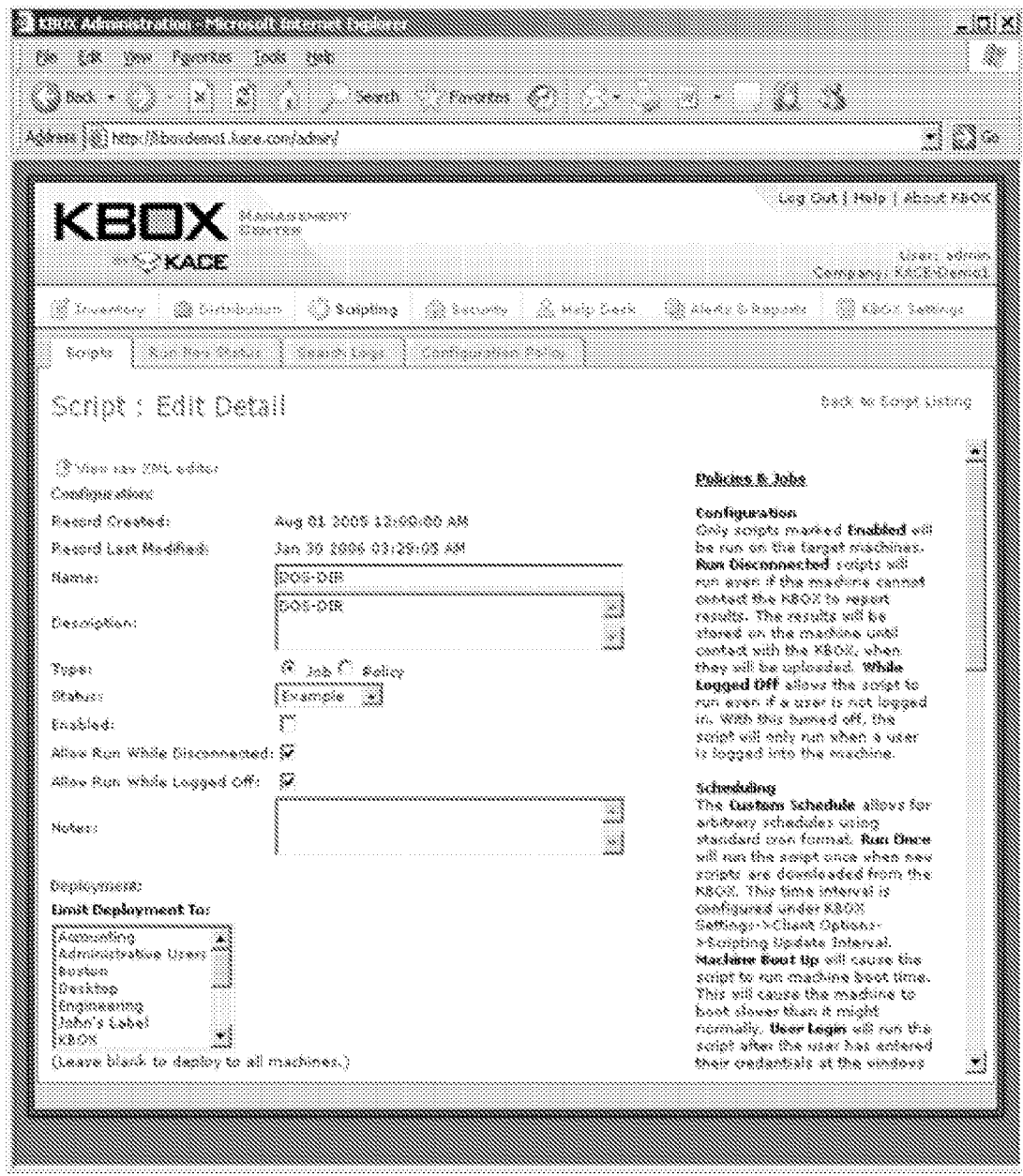
FIGS. 5A-5C are screenshots of exemplary user interfaces for implementing the scripting module of FIG. 3 in accordance with an embodiment of the invention.
Figure 5B:
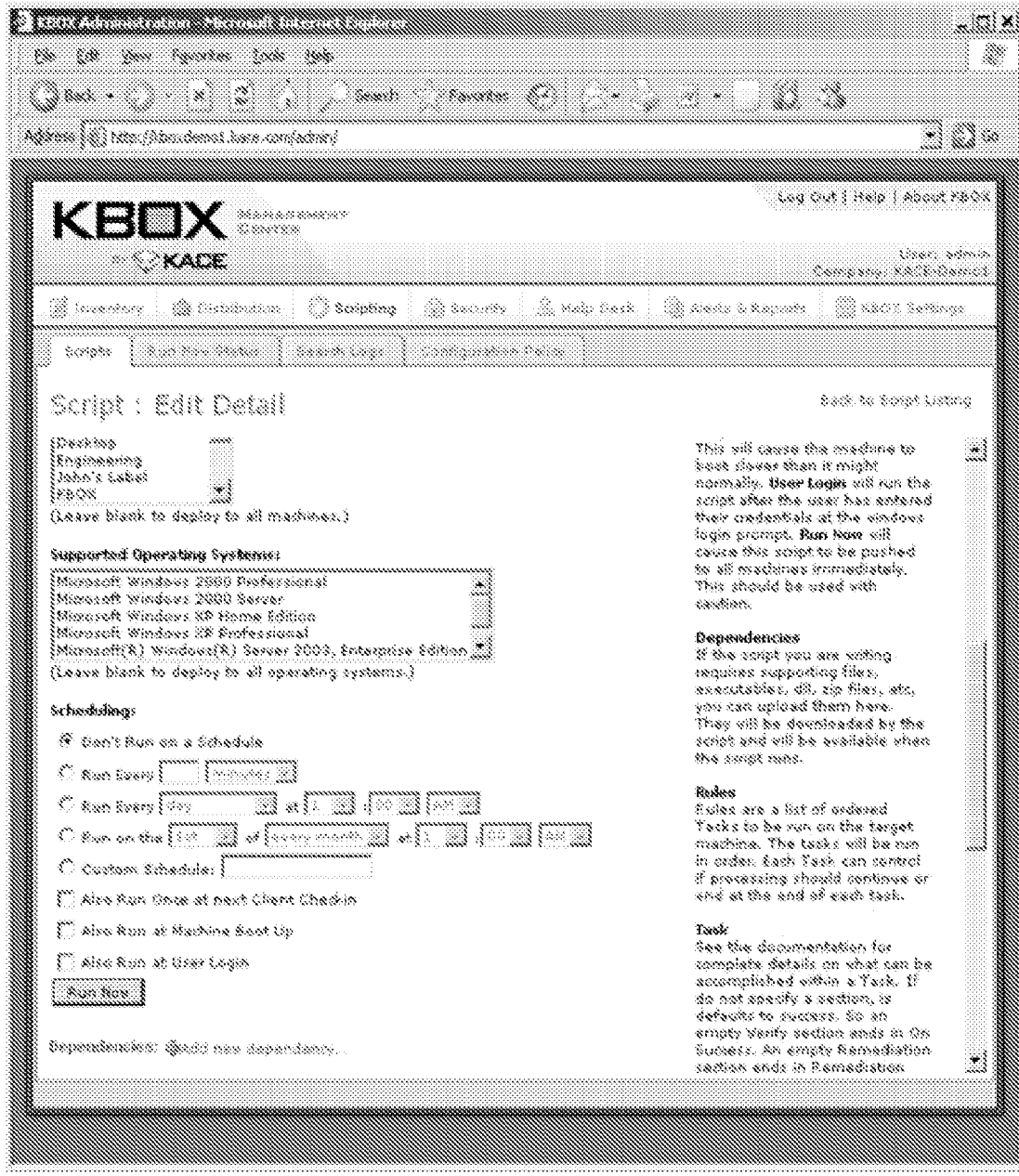
Figure 5C:
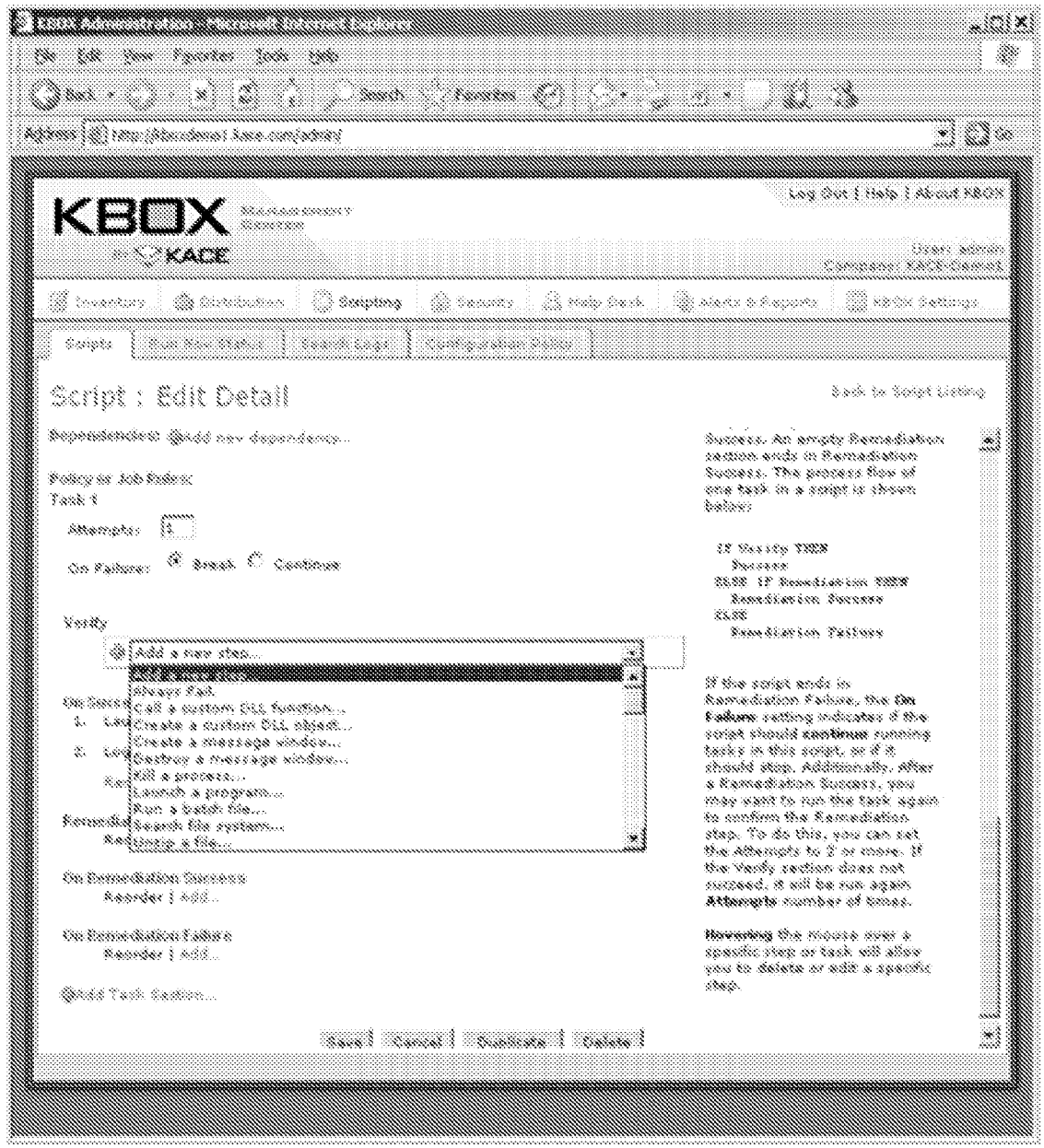

FIG. 5A-5C are screenshots of exemplary user interfaces associated with the scripting module of FIG. 3. The scripting module contains code for defining and creating scripts via web interfaces, storing and managing scripts on an automation appliance, transferring scripts to client agents, executing scripts by processing engines on client agents, and logging and reporting of script execution, status, and output information to the appliance.

A script is an executable program that includes one or more of the following components:

Name, Description, Notes, and General Type. Type designators are either "Job" or "Policy" where jobs are actions that run periodically and policies are state that is enforced A set of commands to be executed on a client device or in association with a network entity Status Designator: One of "Production", "Draft", "Example", "Template"

Optional runtime switches that designate whether the script should execute "while disconnected" from the network and if the script should execute when the host computer is "logged off"

Target Deployment List: A set of script labels that designate which computers or groups of computers the script should be deployed to and executed on Target Operating System List: A set of Operating Systems that should be targeted for script deployment and execution A script schedule which includes the following scheduling options:

Run every X minutes/hours

Run every X days at X time

Run every X day of X month at X time

Run on a custom schedule

Run once at next Agent Communication to an automation appliance

Run at host computer boot up time

Run at Login time of end-user on host computer

Scripts can be programmed to run interactively (with the user) or silently (as a background non-interactive process). They also can be scheduled to run while connected (networked) to an automation appliance or other host, or disconnected from the automation appliance, while a client computer is offline. In an embodiment, scripts are generated in order for them to be carried out by agents on client devices. This way, a script can execute even when the client computer or device is disconnected from a network. Scripts may be programmed to "run on demand," that is immediately executed when received on a target computer. In an embodiment, the scripting module 240 integrates other assorted script components into scripts. These include digital files that the script relies on for execution such as executable binary files, libraries, scripts, or other components. Scripts also comprise rules for the execution of tasks within a specific script process flow control. The process flow of a script includes, for instance an outer attempt loop with definitions for "breaks" and "continues" for each respective "Task Section". Each "Task" includes optional "Verify, On Success, Remediation, On Remediation Success, and On Remediation Failure" control sections. These control sections represents "if . . . then . . . else . . . " program blocks.

Once a script is defined on an automation appliance, the script is stored in XML form. The XML Schema (XSD) for the script verifies the integrity of the script definition and the XML language for the script is additionally utilized by a client agent to ensure script validity prior to its execution. An example script XML representation is as follows:

```
<?xml version="1.0" encoding="utf-8" ?>
<kbots xmlns="http://kace.com/Kbots.xsd">
<kbot>
<config name="DOS-DIR" type="job" id="8" version="1138620545" description="DOS-DIR">
    <execute disconnected="true" logged_off="true">
    </execute>
</config>
<compliance>
    <verify on_failure="break" attempts="1">
        <on_verify_success>
            <launch_program path="SYS" program="cmd.exe" wait="true" parms="/C DIR" />
            <log_message type="status" message="DOS Command Issued Successfully." />
        </on_verify_success>
        <on_verify_failure>
```

```
        <on_remediation_success>
        </on_remediation_success>
        <on_remediation_failure>
        </on_remediation_failure>
      </on_verify_failure>
    </verify>
  </compliance>
  </kbot>
</kbots>
```

The use of XML allows scripts to be executed across heterogeneous computer platforms while managed from the same automation appliance.

The script can be provided to a client device based on any number of possible methods. In an embodiment, the script can be published to a portal where it can be downloaded to a client device. And/or, the script can be deployed automatically from an automation appliance to a distribution of client devices. The scripts may also be targeted to agents on the client devices. In another embodiment, a user can directly request the script, for instance, from a client device including a user portal, for instance. The scripting module may then verify whether the client device has the proper qualification—for instance that the device belongs to a label group that has permission to access the script. If the client device does not have the proper label or qualification, then the request is denied.

FIGS. 5A-5C comprise screen shots of user interfaces for defining a script within a web interface. The scripting module may support both the execution of native script steps (commands) and execution of external commands (hosted by third party software, programs, batch file, scripts, etc). For example, third party programs can be executed using the "script definition task" of a "Launch Program" or "Call DLL Function" protocol. Script deployment can include the transfer of third party software executable code or libraries to an agent thru a "dependency" association definition in the script. In this way, scripts can provide a mechanism for executing, controlling, and managing non-native executable code or code segments as if they were native entities.

Once defined and enabled, scripts are transferred to the client agents for execution, in an embodiment in accordance with a filtering scheme that defines which clients or devices the scripts should be deployed to. In an embodiment, an agent receives a script manifest and caches it locally while awaiting execution. In an embodiment, control of the script is retained by the automation appliance. However, as described earlier, scripts may execute on clients even when the clients are neither connected to the network or automation appliance. Log information about the status of each script and its execution may be collected. For instance, information each process activity, output, status, and state is maintained by the agent. This log information is cached on the local client until a connection to the automation appliance is achievable. At that point, the log information is transmitted to the automation appliance for the purposes of central storage, searchability, and reportability. The automation appliance may track script deployments and operational statistics. Additionally, since scripts are stored in an XML representation, scripts may be edited, shared, imported, and created directly via XML or XML editing tools.

User Portal

Figure 6B:
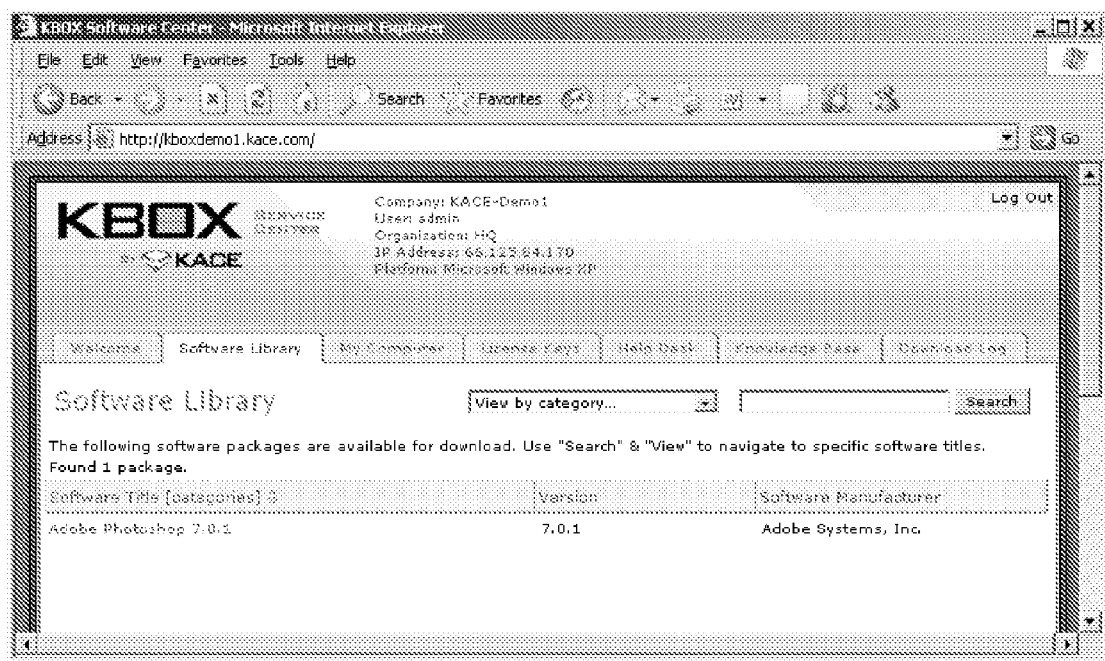
Figure 6C:
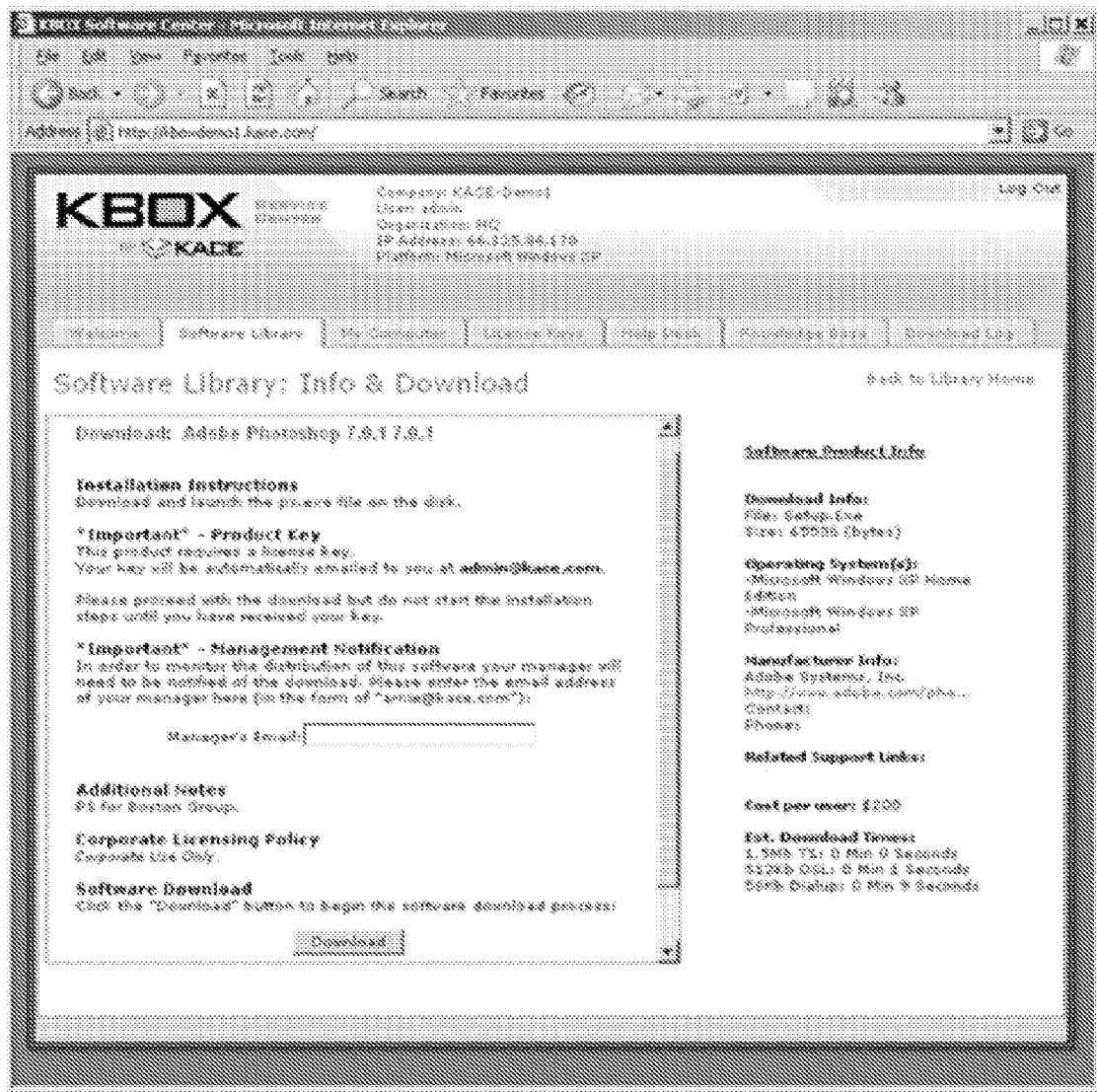

Scripts may also be made available to users to be downloaded upon request from a user portal. FIGS. 6A-6C are screenshots of an exemplary user portal in accordance with an embodiment of the invention. A user portal can be used to provide a number of IT services to end users. Using such a portal, a user may be able to search a software library that allows for the publication, retrieval, download, and installation of software packages, patches, scripts and electronic documents, and produce a software and computer inventory manifest of the user's computer. Furthermore, in an embodiment, a user portal comprises an interface for searching an an online knowledgebase, a repository of information including articles, entries, websites, or other information that can be provided by an information appliance or populated by a member of the IT staff. In addition, the portal can include an interface for downloading software and software license key log information for the current user as well as provide interactive access to the user's specific help desk trouble tickets and a help desk database.

In an embodiment, a portal provided to a user is tailored to the user, based on an attribute of the user or an attribute of the device from which the user is accessing the portal. In an embodiment, the appliance receives an input that identifies the user, and uses it to determine an attribute of the user based on pre-stored information about the user. The input could, for instance, comprise the user's login credentials or information provided by an agent or the operating system of the computer from which the user is requesting access to the user portal. Likewise, the pre-stored information could comprise information about the user stored during an inventory scan, label information assigned to the user, or other information within a data store. Based on the inputs, a determination is made as to which of a number of possible downloads to make available to the user and code representing a user portal that reflects this determination is generated. For example, a certain application may be made published only to users who belong to a certain department, or occupy a certain level in an enterprise hierarchy, or have been employed over a certain period of time. In an embodiment, such attributes are reflected in group label membership. Based on login credentials and group label membership, the user may have access to both globally published portal packages and packages specific to the end-user's label group.

Numerous other policies that restrict access to an application based on a user attribute may also influence the view that the user is provided. In addition, the availability of the resource and possibly license terms on which the resource has been made available can be reflected in the portal. Further, a user portal may be tailored to an attribute of the device. For instance, software upgrades and patches for a specific application are only shown to users who access the portal from a device on which that specific application is installed. FIG. 6B shows an exemplary user interface of a user portal for a user who only has access to one software package, Adobe Photoshop, for download. Other users, however, may have access to other or different software packages.

In an embodiment, the user portal allows users to download and install software, including operating system packages. Alternatively or in addition, the user portal also allows users to download scripts selected by the user. Such scripts could specify, for instance, the running of a set of clean up utilities, virus detection modules, and/or efficiency enhancing tasks (such as a disk defragmenter, desktop cleanup etc.). Other script utilities could be made available to allow a user to more easily implement desktop controls such as settings or install third-party software from a third-party website. Or, to perform tasks such as internet file cleanup, customizing browser settings, disk clean up, backup, email settings, desktop settings, user migration tasks, network configuration, and operating system configuration. Software may also be downloaded and installed as described below.

The user portal also allows the end user to trigger, time, and perform the installation of selected software onto the user's own desktop computing platform, even if the end-user does not normally have "administrative privilege" or "administrative credentials". This is accomplished by the execution of scripts and installation tasks by an agent on a client as described above. In an embodiment, the agent receives instant notification from an automation appliance that the end-user has initiated either a script execution or package installation. The agent identifies which software package is currently active and may manage the download (transfer) of the portal package to the end-user computer desktop.

Once transferred, the agent may execute the script package or installation package based on the package definition settings. The agent executes the package action within an elevated administrator-level privilege. This allows both package scripts and package installations to be performed by end-users who may not be administrators nor maintain any administrator-level privileges. The user portal may also proxy administrative privileges and duties directly to end-users in regards to portal package distribution and execution. The user portal may also provide any needed license key or authorization information needed to complete an installation.

An administrator portal can be used to control, publish, and target which users are allowed access to specific software entities as well as to define and publish software entities to the self-service user portal. Using an interface such as the one shown in FIG. 6A, the administrator may control one or more of the following attributes of a "Portal Package" deployment:

- The portal package type including support for a "Download", "Install", and "Script" types:
  - Download package types are software packages that the user downloads directly to disk but no execution of the package is performed;
  - Install package types include the download and installation execution of the downloaded package; and
  - Script deployment types include the execution of script packages on the end-user's computer.
- Download types of either "Software" or "Patches" (for non-script packages)
- Choose-able link to respective digital asset (e.g. software package, script, download package)
- Installation command line and command line parameters if type "Install"
- End-User display of software title cost
- End-User distribution of Software Product Key (License Key) Information
- Email notification triggers to support messaging to both the end-user and the end-users manager (for audit purposes)
- Description/Notes field
- Download instructions and license text information for end-user consumption
- Optional documentation (help) file related to the respective software package that may be deployed to the portal along with the respective portal package Taking the example of the Adobe Photoshop application shown for download in FIG. 6B, a user may click on the software title and view its contents as shown in FIG. 6C. Thus, the details of a portal package are presented to an end-user along with links/buttons to trigger the download, installation, or execution of the portal package on the end-users computer. User instructions may also be provided to users through the portal.

Based on the administrative settings of the portal package, an end-user may be required to enter additional information for audit trail and notification purposes. The end-user may optionally be present with license key information necessary to install or activate the software installation. In an embodiment, when a user installs an application, an email notification is sent to the user's manager. The automation appliance may process any email notifications required by the portal package definition including management notification of the software distribution (for fiscal, budgetary, and audit compliance) and additionally end-user notification of sensitive package detail information (e.g., Software License Key information). After an action has taken place, a user portal may maintain an end-user activity history and allows the end-user to view previous download, installation, and script logs that were self-served and for an administrator to track the actions taken throughout the enterprise the portal.

Administrator Portal

The various functionalities and tasks described above can be controlled from an administrator portal. FIG. 7 is a screenshot of an exemplary administrative portal in accordance with an embodiment of the invention. The administrator portal is a web-based interface that systems administrators use to access and direct the functionality and capabilities within the automation appliance. As shown, the administrator portal can support a variety of tasks including inventory management, software distribution, scripting, security, help-desk, alerts & reports and appliance settings.

FIG. 7 depicts a dashboard view from which an administrator can view the status of various automation appliance activities. This information reflects summary data regarding the status and operation of devices on the network collected, for instance, through network scans, activity logging, and activities to inventory the devices on a network for hardware and software information, security information, and/or patch deployment information. Included are summary data regarding the network devices and their operating system, software and software distribution statistics, alerts, patches, virus and vulnerability detection, and network scan information. The dashboard view may also include ratings or level indicators regarding the total security level of all management agents. Sample indicators include the number of malware items detected across all managed endpoints, the number of vulnerabilities detected on the network, the number of active critical virus or trojans, the execution of antivirus measures, and summaries of machines remediated to a safe threat level. As known to one of skill in the art, other network or appliance data stored in the data store could also be presented.

The foregoing description of embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of embodiments of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Embodiments of the invention also include computer program products for performing various operations disclosed herein. The computer program products comprises program code that may be embodied on a computer-readable medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. One or more parts of the program code may be distributed as part of an appliance, downloaded, and/or otherwise provided to a customer.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

What is claimed is:

1. A computer program product for automating the performance of information technology (IT) tasks within an enterprise comprising a plurality of client devices, the product including a non-transitory computer-readable medium and comprising computer program code encoded on the medium for:
   receiving an input specifying a set of commands to be executed on a client device;
   generating a script based on the set of commands;
   receiving an input specifying a filter definition to be applied to the plurality of client devices and a label associated with the filter definition;
   assigning the label to any client device of the plurality of client devices that meets the filter definition;
   receiving an input specifying that the script should be made available to client devices assigned the label;
   providing the script to client devices assigned the label;
   receiving a request for the script made from a client device;
   determining whether the client device has the label assigned to it; and
   responsive to the client device not having the label assigned to it, denying the request.

2. The computer program product of claim 1, wherein the code for providing comprises code for providing the script to be downloaded from a portal to the device.

3. The computer program product of claim 1, wherein the code for generating comprises code for generating a script to be executed by an agent on a client device, the agent comprising code for executing a command of the set of commands.

4. The computer program product of claim 1, wherein the script is in an XML format.

5. The computer program product of claim 1, wherein the code for generating comprises code for integrating third party commands into the script.

6. The computer program product of claim 1, wherein the code for providing comprises code for providing the script to a plurality of client devices, and wherein the computer program product further comprises computer program code for:
   receiving information about the status of the script's execution from the plurality of client devices;
   storing the information; and
   providing an interface for searching the information.

7. The computer program product of claim 6, wherein the code for receiving comprises receiving information from a plurality of agents, each on a client device of the plurality of client devices.

8. The computer program product of claim 1, wherein the medium comprises a memory associated with an IT automation appliance that further comprises computer program instructions for performing at least one of, within the enterprise: a security task, a helpdesk task, an inventory task, software or patch deployment task, and a task to manage agents on the enterprise network.

9. The computer program product of claim 1, wherein the plurality of client devices comprise at least one of: a router, a switch, and a firewall.

10. A system, executing on hardware, for developing and deploying information technology (IT) scripts within an enterprise comprising a plurality of entities, the system comprising:
    a filtering system for applying labels to entities that meet filter definitions and removing labels from previously labeled entities that no longer meet filter definitions;
    a scripting module for generating scripts for performing IT tasks on entities within the enterprise; and
    a deployment module for:
       deploying the generated scripts within the enterprise to entities based on labels assigned to the entities by the filtering system, including by:
          receiving a request for a generated script from an entity;
          determining whether the requesting entity has a label required for access to the script assigned to it; and
          responsive to the client device not having the label assigned to it, denying the request.

11. The system of claim 10, further comprising an interface module for receiving information from entities about the status of scripts deployed to the entities by the deployment module.

12. The system of claim 11, further comprising a memory for storing the information.

13. The system of claim 10, wherein the deployment module is configured to provide scripts generated by the scripting module to be downloaded from a self-service portal.

14. The system of claim 10, wherein the scripting module is configured to generate a script for performing an IT task by an agent on a client device, the agent comprising code for executing a command of the set of commands.

15. The system of claim 10, further comprising an inventory module for collecting information about the plurality of entities to be provided to the filtering system for applying and removing labels.

16. The system of claim 10, further comprising a security module for scanning and reporting on security vulnerabilities within the enterprise, and wherein the scripting module is configured to generate scripts to address security vulnerabilities detected with the security module.

17. The system of claim 10, further comprising a helpdesk module for managing helpdesk tasks on the network.

18. A method, executing on hardware, for automating the performance of information technology (IT) tasks within an enterprise comprising a plurality of client devices, the method comprising the steps of:
  receiving an input specifying a set of commands to be executed on a client device and generating a script based thereon, wherein the script is configured to be executed by an agent on the client device;
  receiving an input specifying to which of the plurality of client devices the script should be made available; and
  providing the script to a client device based on the input by publishing the script to a user portal and by deploying the script to the client device;
  receiving a user input specifying a filter definition;
  associating a label with the filter definition;
  automatically evaluating the plurality of client devices to determine which devices meet the filter definition;
  assigning the label to any client device of the plurality of client devices that meets the filter definition; and
  with respect to a client device having the label assigned to it:
    receiving updated data about the labeled client device;
    automatically re-evaluating the labeled client device to determine whether it still meets the filter definition; and
    responsive to the labeled client device no longer meeting the filter definition, removing its label.

19. The method of claim 18, further comprising:
  wherein providing comprises providing the script to a client device based on the client device having a label required for access to the script assigned to it.

20. The method of claim 18, further comprising receiving an input specifying a schedule upon which the script client device should be executed and generating the script based thereon.

21. The method of claim 20, wherein providing comprises providing from an IT automation appliance, and the schedule can specify specifies whether the script should be executed when the client device is connected to the appliance or disconnected from the appliance.

22. The method of claim 18, further comprising receiving an input specifying whether the script should be executed as a background process or a user-activated process and generating the script based thereon.

23. The method of claim 18, wherein generating comprises integrating third party commands into the script.

24. The method of claim 18, further comprising:
  receiving a request for the script made from a client device;
  determining whether the client device has the label assigned to it; and
  responsive to the client device not having the label assigned to it, denying the request.

* * * * *